US006526293B1

United States Patent
Matsuo

(10) Patent No.: US 6,526,293 B1
(45) Date of Patent: Feb. 25, 2003

(54) WIRELESS COMMUNICATION APPARATUS HAVING RECHARGEABLE BATTERY

(75) Inventor: Ryuji Matsuo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/092,010

(22) Filed: Jun. 4, 1998

(30) Foreign Application Priority Data

Jun. 5, 1997 (JP) ............................................. 9-148217

(51) Int. Cl.[7] .............................. H04B 1/38; H04M 1/00
(52) U.S. Cl. ........................ 455/573; 455/566; 455/567
(58) Field of Search .................. 455/90, 575, 572–574, 455/566, 567, 347, 421; 320/107, 160, 110, 112, 113, 114, 115, 138; 379/441–447

(56) References Cited

U.S. PATENT DOCUMENTS

| | | | |
|---|---|---|---|
| 4,726,052 A | | 2/1988 | Kato et al. .................... 455/403 |
| 4,910,103 A | | 3/1990 | Yoshikawa et al. ............ 429/61 |
| 5,136,229 A | | 8/1992 | Galvin ......................... 320/112 |
| 5,164,652 A | | 11/1992 | Johnson et al. .............. 320/106 |
| 5,223,780 A | * | 6/1993 | Hu ................................ 320/14 |
| 5,677,944 A | | 10/1997 | Yamamoto et al. .......... 455/573 |
| 5,760,754 A | * | 6/1998 | Amero, Jr. et al. ............ 345/82 |
| 5,771,471 A | | 6/1998 | Alberth, Jr. et al. ......... 455/573 |
| 5,867,797 A | | 2/1999 | Hashimoto ................... 455/572 |
| 5,870,615 A | * | 2/1999 | Bar-On et al. .......... 395/750.02 |
| 5,870,683 A | * | 2/1999 | Wells et al. ................. 455/566 |
| 5,872,444 A | | 2/1999 | Nagano et al. .............. 320/106 |
| 5,901,361 A | | 5/1999 | Luong ......................... 455/517 |
| 6,149,725 A | * | 4/2000 | Emmert et al. .............. 455/573 |
| 6,157,316 A | | 12/2000 | Okayama et al. ....... 340/825.44 |
| 6,212,403 B1 | * | 4/2001 | Ushiroda ..................... 455/557 |
| 6,226,533 B1 | * | 5/2001 | Akahane ..................... 455/566 |
| 6,226,536 B1 | * | 5/2001 | Miyashita .................... 455/567 |
| 6,311,080 B1 | * | 10/2001 | Mochida ...................... 455/573 |
| 6,314,270 B1 | * | 11/2001 | Uchida ........................ 455/67.1 |

FOREIGN PATENT DOCUMENTS

| | | |
|---|---|---|
| EP | 0 394 074 A2 | 4/1990 |
| EP | 0 720 305 A2 | 7/1996 |
| GB | 2 288 290 A | 10/1995 |
| JP | 3-215135 | 9/1991 |
| JP | 4-315346 | 11/1992 |
| JP | 5-76138 | 10/1993 |
| JP | 7-50878 | 2/1995 |
| JP | 8-79828 | 3/1996 |
| JP | 8-186623 | 7/1996 |
| JP | 8-340295 | 12/1996 |
| JP | 10-32622 | 2/1998 |

OTHER PUBLICATIONS

Australian Office Action, dated Jul. 19, 2000.
Search and Examination Report, Aug. 20, 1998.
Japansese Office Action dated Mar. 23, 1999, with partial translation.

* cited by examiner

Primary Examiner—Edward F. Urban
Assistant Examiner—Charles Craver
(74) Attorney, Agent, or Firm—McGinn & Gibb, PLLC

(57) ABSTRACT

A wireless communication apparatus includes a first connector for detachably connecting a battery charger to the rechargeable battery and a second connector for detachably connecting an AC adapter. A charge detector detects a connection of the battery charger and an AC adapter detector detects a connection of the AC adapter. A charge controller charges the rechargeable battery when the connection of the AC adapter is detected. A light-emitting indicator is controlled such that the light-emitting indicator lights up in a way different from a normal way depending on the charge detector and the AC adapter detector.

23 Claims, 4 Drawing Sheets

FIG. 3

| CHARGE DETECTION $S_{DET1}$ | AC ADAPTER DETECTION $S_{DET2}$ | CHARGE CONTROLLER | LED OPERATION MODE |
|---|---|---|---|
| 0 | 0 | OFF | NORMAL |
| 1 | 0 | OFF | |
| 0 | 1 | CHARGING OPERATION | CHARGE MODE |
| 1 | 1 | OFF | |

WIRELESS COMMUNICATION APPARATUS HAVING RECHARGEABLE BATTERY

BACKGROUND OF THE INVENTION

1. Field of the Invention

The present invention generally relates to a wireless communication apparatus such as mobile telephone equipment, and in particular to a wireless communication apparatus having a rechargeable battery or secondary battery.

2. Description of the Related Art

Recently, a rechargeable battery has been widely used as a power supply for portable or hand-held wireless telephone equipment in consideration of running costs. Such a rechargeable battery is charged by a battery charger for the wireless telephone equipment. When the wireless telephone equipment is placed on the battery charger, charging power is supplied to the rechargeable battery of the wireless telephone equipment. During battery charging, a light-emitting diode (LED) is turned on or blinking so as to inform a user of charging. The wireless telephone equipment like this has been disclosed in, for example, Japanese Utility-model Unexamined Publication No. 5-76138.

Further, an AC-DC converter (hereinafter, called an AC adapter) is frequently used to charge the rechargeable battery. In this case, when the AC adapter is connected to the electronic device, the display of the electronic device or a dedicated LED indicates the charging state.

As another conventional example, a rechargeable electronic device such as a household electrical appliance has been disclosed in Japanese Patent Unexamined Publication No. 3-215135. The rechargeable electronic device, for example, a rechargeable shaver or bath bubbling apparatus is provided with a rechargeable battery, a rectifier circuit, and an LED section. The LED section includes three LEDs which are used to indicate charging and operating states. When a battery charger having a transformer therein is connected to the rechargeable electronic device, it is detected and the LED section indicates a charging state. When the rechargeable electronic device is operated, the LED section indicates the operating state.

For a wireless communication apparatus such as mobile telephone equipment, it is desirable to reduce in weight and size. According to the above prior-art apparatuses, however, the charge indicator is mounted on the charger or on both the charger and the wireless communication apparatus. Therefore a light source dedicated to charge indication is needed.

In the rechargeable electronic device such as a household electrical appliance, no consideration is given to the portability required for mobile telephone equipment. More specifically, a charge indication LED as well as an operation indication LED are mounted on the household electrical appliance. Further, since a photo coupler is used to detect the battery charger, the connection between the battery charger and the household electrical appliance is complicated.

Furthermore, according to the above prior-art equipment, only one battery charging connector is provided. Therefore, there may be cases where the rechargeable battery cannot be charged.

SUMMARY OF THE INVENTION

An object of the present invention is to provide a wireless communication apparatus and a charging method which can indicate a charge state with simplified circuit configuration.

Another object of the present invention is to provide a wireless communication apparatus and a charging method which can be charged by a plurality of battery charging sources.

According to a first aspect of the present invention, a wireless communication apparatus is comprised of a light-emitting indicator and a rechargeable battery as a power supply for the wireless communication apparatus. The wireless communication apparatus is further comprised of a connector for detachably connecting a battery charger to the rechargeable battery, a charge detector for detecting a charge state by monitoring a voltage of the rechargeable battery, and an indicator controller for controlling the light-emitting indicator such that the light-emitting indicator lights up in a way different from a normal way when the charge state is detected by the charge detector.

According to a second aspect of the present invention, a wireless communication apparatus is comprised of a rechargeable battery as a power supply for the wireless communication apparatus, a first connector for detachably connecting a first charging source to the rechargeable battery, a first detector for detecting a charge state by monitoring a voltage of the rechargeable battery, a second connector for detachably connecting a second charging source, a second detector for detecting connection of the charging source, and a charge controller connected to the second connector, for charging the rechargeable battery using charge power received from the second charging source when the connection of the second charging source is detected.

The wireless communication apparatus may include a light-emitting indicator, and an indicator controller for controlling the light-emitting indicator such that the light-emitting indicator lights up in a way different from a normal way when at least one of the charge state and the connection of the second charging source is detected.

According to a third aspect of the present invention, in a method for indicating a charge state in a wireless communication apparatus having a light-emitting indicator and a rechargeable battery as a power supply, a charge state is detected by monitoring a voltage of the rechargeable battery and the light-emitting indicator is controlled such that the light-emitting indicator lights up in a way different from a normal way when the charge state is detected by the charge detector.

According to a fourth aspect of the present invention, in a method for charging a rechargeable battery of a wireless communication apparatus, a connection of a battery charger is detected by monitoring a voltage of the rechargeable battery and a connection of an AC-to-DC converter is detected. The rechargeable battery is charged using charge power received from the AC-to-DC converter when the connection of the AC-to-DC converter is detected and the connection of the battery charger is not detected, and is charged using charge power received from the battery charger when the connection of the battery charger is detected.

BRIEF DESCRIPTION OF THE DRAWINGS

FIG. 3 is a diagram showing charge operation and LED control operation according to the second embodiment.

DETAILED DESCRIPTION OF THE PREFERRED EMBODIMENTS

Figure 1:
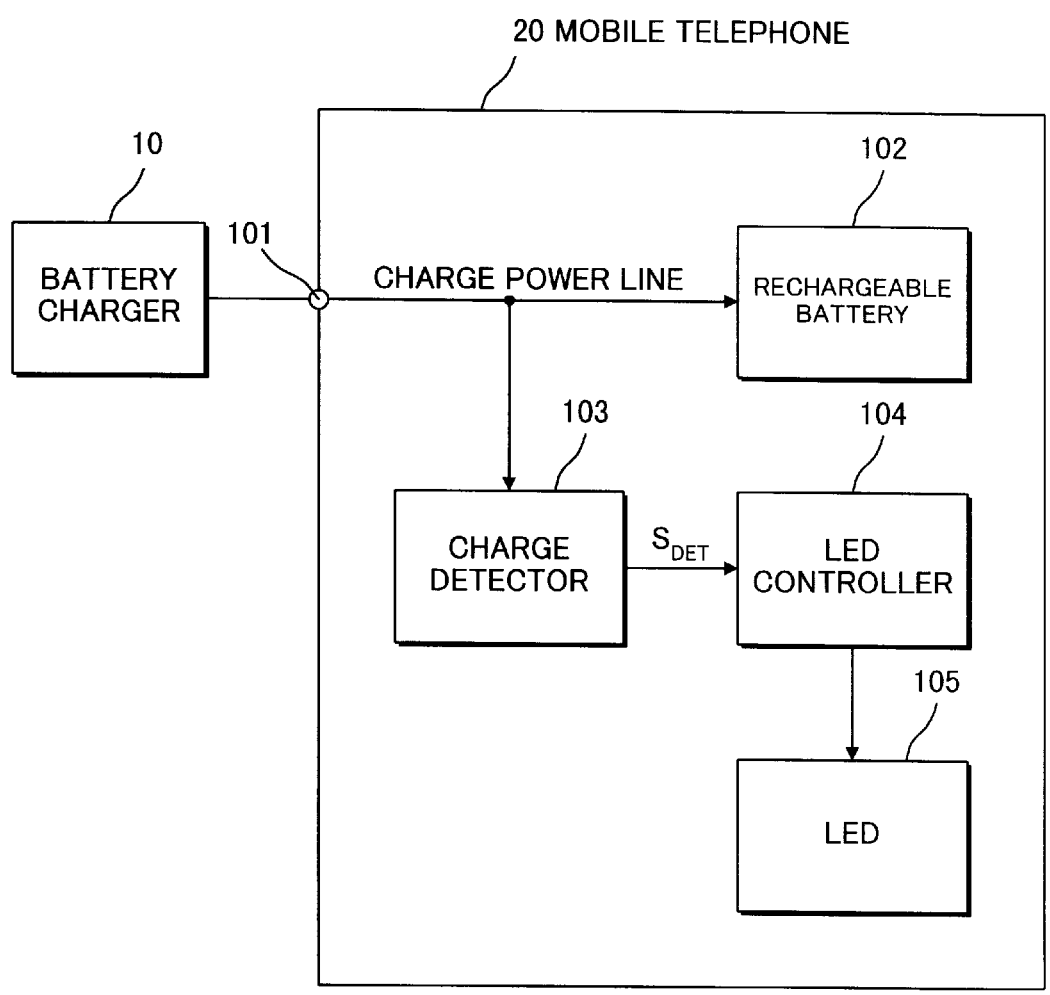
FIG. 1 is a schematic block diagram showing mobile telephone equipment according to a first embodiment of the present invention.

Referring to FIG. 1, a battery charger 10 can be electrically connected to a mobile telephone apparatus 20 through a connector 101. The mobile telephone apparatus 20 is provided with communication circuits and other necessary circuits which are not shown for simplicity in this figure. The charging power is supplied from the battery charger 10 to a rechargeable battery 102 provided within the mobile telephone apparatus 20. In addition to the rechargeable battery 102, a charge indicator of the mobile telephone apparatus 20 is comprised of a charge detector 103, an LED controller 104 and an LED 105.

The rechargeable battery 102 may be a rechargeable lithium-ion battery. In the case of lithium-ion battery, the battery charger 10 is designed to charge the lithium-ion battery as well known.

The charge detector 103 detects the charge state by monitoring a voltage change of a charge power line connecting the connector 101 to the rechargeable battery 102. More specifically, when the battery charger 10 is connected to the connector 101 of the mobile telephone apparatus 20, the charge power line increases in voltage. Such a change in voltage is used to detect the connection and the charge state of the battery charger 10. On the other hand, when the charge detector 103 also detects a predetermined voltage on the charge power line, it is determined that the rechargeable battery 102 is in full charge state. The charge detector 103 outputs a detection signal $S_{DET}$ to the LED controller 104 which controls the LED 105.

The LED 105 is provided on the housing of the mobile telephone apparatus 20 so as to be easily visible. The LED 105 is normally used to indicate call incoming in an ordinary mobile telephone apparatus. In this embodiment, the LED 105 is also used to indicate the charge state of the rechargeable battery 102. More specifically, when the charge detector 103 detects the charge state, the LED controller 104 makes the LED 105 blink or simply light up so as to indicate the charge state. When indicating the charge state, it is desirable that the LED 105 lights up in a different way from when normal. It is further desirable that the LED 105 lights up when charging in a different way from when in full charge.

Since an ordinary mobile telephone apparatus is usually provided with the LED 105, it can be used to indicate the charge state. Therefore, this embodiment may be implemented by only adding the charge detector 103 and modifying the LED controller 104 such that it makes the LED 105 blink or simply light up so as to indicate not only the call incoming but also the charge state.

Figure 2:
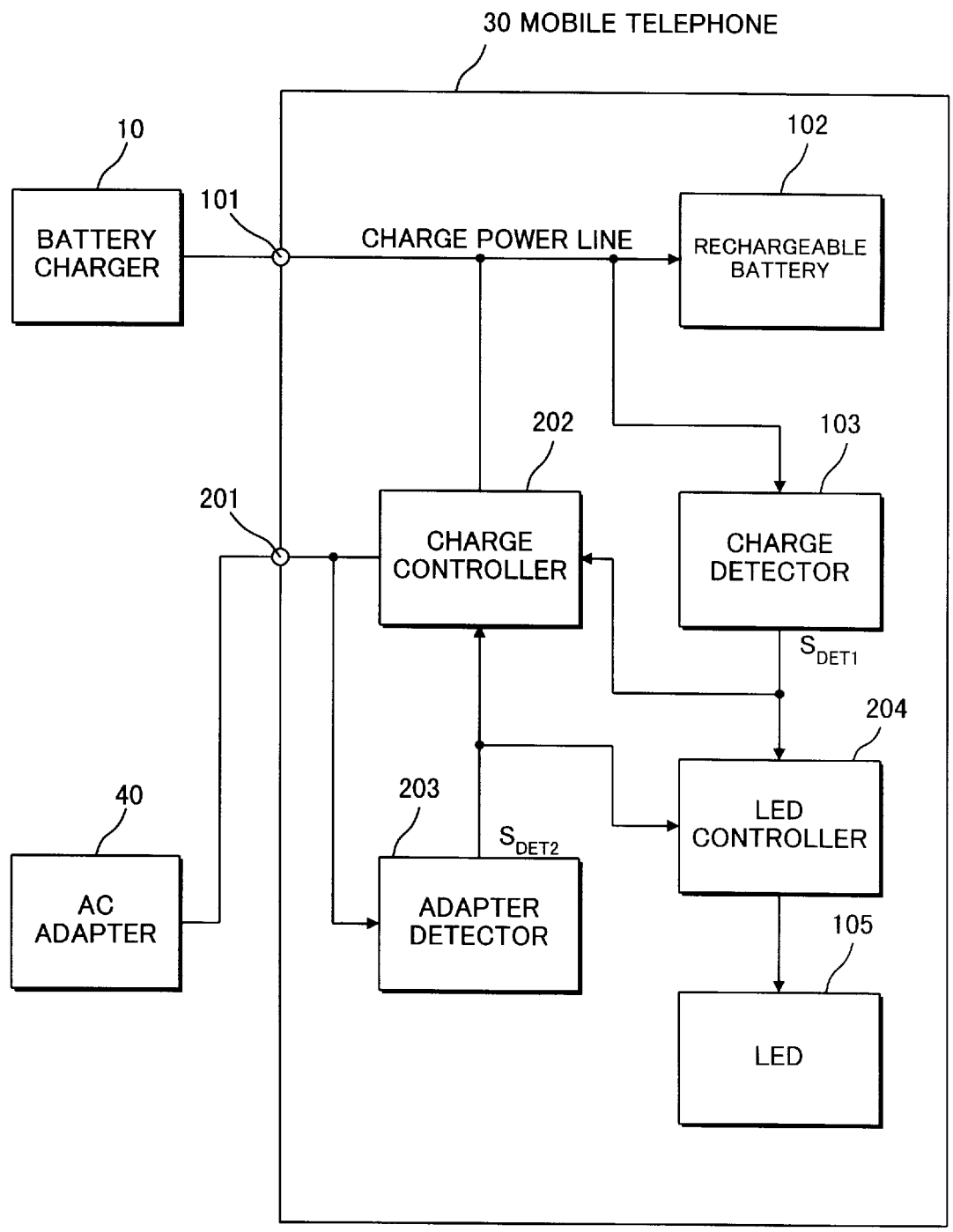
FIG. 2 is a schematic block diagram showing mobile telephone equipment according to a second embodiment of the present invention.

FIG. 2 shows a second embodiment of the present invention, where circuit blocks similar to those previously described with reference to FIG. 1 are denoted by the same reference numerals.

A battery charger 10 can be electrically connected to a mobile telephone apparatus 30 through a connector 101. Further, an AC adapter 40 can be electrically connected to the mobile telephone apparatus 30 through a connector 201. The mobile telephone apparatus 20 is provided with communication circuits and other necessary circuits which are not shown for simplicity in this figure.

The connector 201 is connected to a charge controller 202 and an AC adapter detector 203. The charge controller 202 is further connected to a charge power line which connects the connector 101 to a rechargeable battery 102. The charging power is supplied from one of the battery charger 10 and the AC adapter 40 to the rechargeable battery 102.

The rechargeable battery 102 may be a rechargeable lithium-ion battery. In the case of lithium-ion battery, the battery charger 10 and the charge controller 202 are designed to charge the lithium-ion battery as well known.

A charge detector 103 detects the charge state by monitoring a voltage change of the charge power line connecting the connector 101 to the rechargeable battery 102. More specifically, when the battery charger 10 is connected to the connector 101 of the mobile telephone apparatus 30, the charge power line increases in voltage. Such a change in voltage is used to detect the connection and the charge state of the battery charger 10. On the other hand, when the charge detector 103 also detects a predetermined voltage on the charge power line, it is determined that the rechargeable battery 102 is in full charge state. The charge detector 103 outputs a detection signal $S_{DET1}$ to an LED controller 204 and the charge controller 202.

The charge controller 202 performs constant current charging of the rechargeable battery 102 when the charge is started by the AC adapter 40. More specifically, when the AC adapter 40 is connected to the connector 201 of the mobile telephone apparatus 30, the connector 201 increases in voltage. The AC adapter detector 203 monitors such a change in voltage which is used to detect the connection and the charge state of the AC adapter 40. When detecting the AC adapter 40, the AC adapter detector 203 outputs a detection signal $S_{DET2}$ to the LED controller 204 and the charge controller 202. When receiving the detection signal $S_{DET2}$ from the AC adapter detector 203, the charge controller 202 starts constant current charging while monitoring the detection signal $S_{DET1}$ received from the charge detector 103. When the battery voltage reaches the predetermined voltage, the charge detector 103 determines that the rechargeable battery 102 is in full charge state and outputs the detection signal $S_{DET1}$ indicating the full charge state to the charge controller 202. When receiving the detection signal $S_{DET1}$ indicating the full charge state from the charge detector 103, the charge controller 202 changes from the constant current mode to constant voltage mode. Such a charging way is commonly used in the case of lithium-ion battery and it is the same with the battery charger 10.

The charge controller 202 further performs selection of charge sources. More specifically, when the battery charger 10 and the AC adapter 40 are both connected to the connectors 101 and 201, respectively, the charge controller 202 receives both the detection signals $S_{DET1}$ and $S_{DET2}$ from the charge detector 103 and the AC adapter detector 203, respectively. In this case, the charge controller 202 stops the charging operation of the AC adapter 40 (see FIG. 3).

The LED 105 is provided on the housing of the mobile telephone apparatus 30 so as to be easily visible. The LED 105 is normally used to indicate call incoming in an ordinary mobile telephone apparatus. In this embodiment, the LED 105 is also used to indicate the charger type and the charge state of the rechargeable battery 102. The LED controller 204 performs the control of the LED 105 depending on the detection signals $S_{DET1}$ and $S_{DET2}$ as in the case of the charge controller 202. The details of LED control will be described hereinafter with reference to FIG. 3.

Referring to FIG. 3, when neither the battery charger 10 nor the AC adapter 40 is connected to the mobile telephone apparatus 30, the detection signals $S_{DET1}$ and $S_{DET2}$ are both 0. In this case, the LED controller 204 performs normal control of the LED 105. That is, when an incoming call occurs, the LED 105 blinks or lights up to inform the user of call incoming.

When only the battery charger 10 is connected to the mobile telephone apparatus 30, the detection signal $S_{DET1}$ is 1 and the detection signal $S_{DET2}$ is 0. Since the rechargeable battery 102 is charged by the battery charger 10, the LED controller 204 makes the LED 105 operate in a charge operation mode different from the normal operation mode to inform the user of charging by the battery charger 10. For example, the frequency of blinking or the intensity of light may be different between them.

When only the AC adapter 40 is connected to the mobile telephone apparatus 30, the detection signal $S_{DET1}$ is 0 and the detection signal $S_{DET2}$ is 1. The rechargeable battery 102 is charged by the charge controller 202 receiving the charge power from the AC adapter 40. The detection signal $S_{DET1}$ goes high when the charge is started. Therefore, the LED controller 204 makes the LED 105 operate in the charge operation mode to inform the user of charging by the AC adapter 40. The LED 105 may blink or light up in different way from the normal operation mode. It is possible that, in the case of the AC adapter 40, the LED controller 204 makes the LED 105 operate in another charge operation mode different from the charge operation mode.

When the battery charger 10 and the AC adapter 40 are both connected to the mobile telephone apparatus 30, the detection signals $S_{DET1}$ and $S_{DET2}$ is both 1. Since the rechargeable battery 102 is charged by the battery charger 10 in this case as described before, the LED controller 204 makes the LED 105 operate in the charge operation mode. The charge operation mode may be different in blinking frequency or light intensity to the normal mode.

The LED 105 is not limited to a single LED. The LED 105 may include a plurality of LEDs so that the normal operation mode and the charge operation mode are indicated by changing lighted-up LED or the frequency of blinking. Further, the different charge operation modes may be indicated by different LEDs or different frequencies of blinking.

Further, when the battery charger 10 and the AC adapter 40 are both connected to the mobile telephone apparatus 30, the charge controller 202 and the charge power line can be easily designed to charge the rechargeable battery 102 by the AC adapter 40. In this case, when the detection signals $S_{DET1}$ and $S_{DET2}$ is both 1, the LED controller 204 makes the LED 105 operate in the charge operation mode.

Furthermore, when the charge is started, the LED 105 desirably lights up in a different way from when in full charge.

Figure 4:
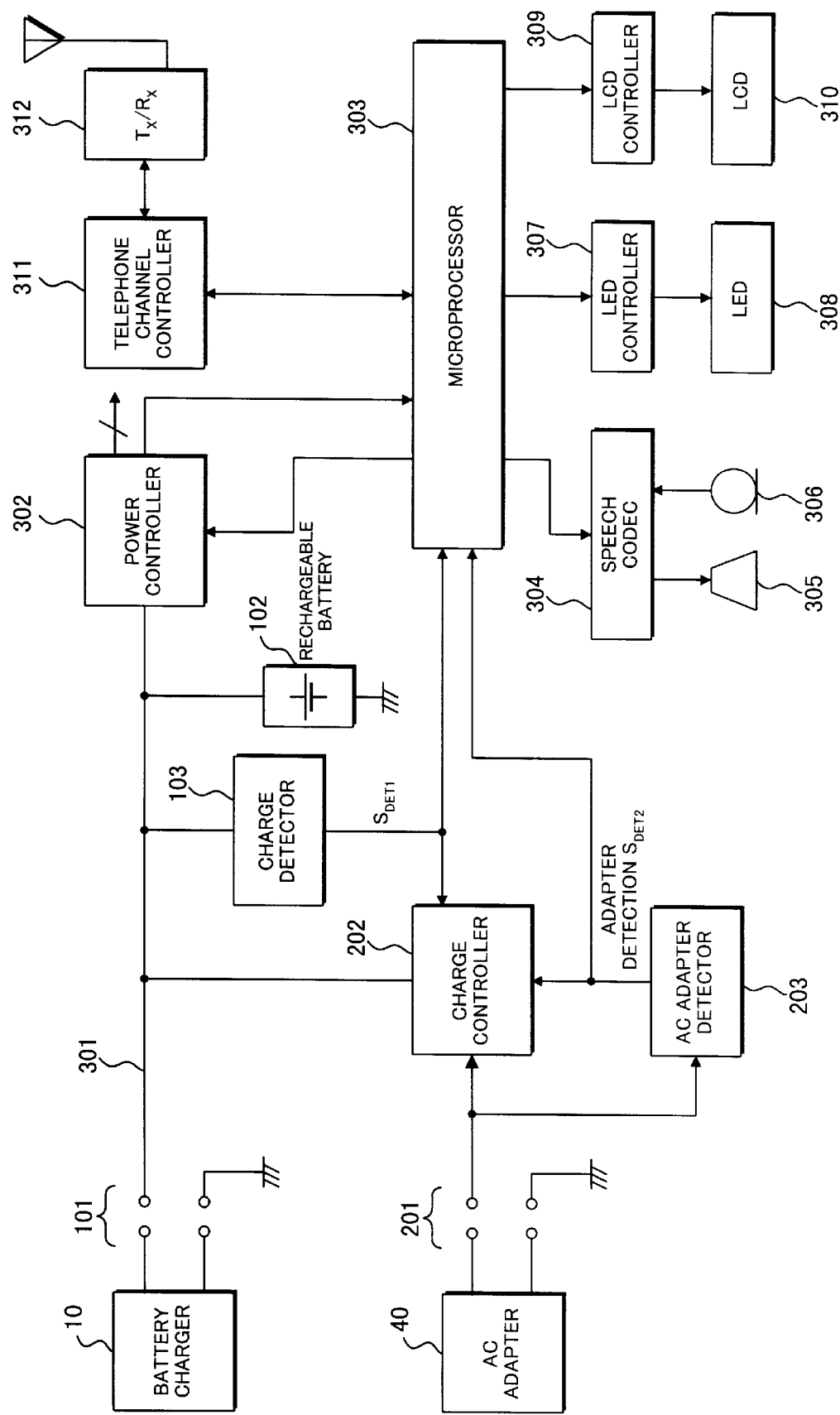
FIG. 4 is a block diagram showing the detailed circuit configuration of a mobile telephone apparatus according to the second embodiment.

FIG. 4 shows the detail circuit configuration of the mobile telephone apparatus 30 of FIG. 2, where circuit blocks similar to those previously described with reference to FIG. 2 are denoted by the same reference numerals and the descriptions are omitted.

Referring to FIG. 4, a charge power line 301 connects the connector 101 and the charge controller 202 to the rechargeable battery 102 (here, rechargeable lithium-ion battery). The rechargeable battery 102 is further connected to a power controller 302 which controls power supplying to circuits of the mobile telephone apparatus 30.

The mobile telephone apparatus 30 is further provided with a microprocessor 303 which performs the control of operations including the LED operations as described before. The microprocessor 303 is connected to a speech encoder/decoder (codec) 304 which is further connected to a speaker 305 and a microphone 306. The microprocessor 303 controls an LED controller 307 so that an LED section 308 is made operate in a selected operation mode as described before. Further, the microprocessor 303 controls an LCD controller 309 which controls a liquid-crystal display (LCD) 310. The microprocessor 303 controls a telephone channel controller 311 and a radio system 312 which are used to perform telephone communication.

As described before, the charge controller 202 operate depending on the detection signals $S_{DET1}$ and $S_{DET2}$. Similarly, the microprocessor 303 controls the operations of the LED section 308 depending on the detection signals $S_{DET1}$ and $S_{DET2}$. It is possible that the LED controller 307 controls the operations of the LED section 308 as in the case of FIG. 2. It is further possible that the microprocessor 303 controls the selection operation of the charge controller 202 and the operations of the LED section 308.

What is claimed is:

1. A wireless communication apparatus comprising:
   a light-emitting indicator used to indicate a first status of said apparatus;
   a rechargeable battery as a power supply for the wireless communication apparatus;
   a connector for detachably connecting an external battery charger to the rechargeable battery;
   a charge detector for detecting a charge state by monitoring a voltage of the rechargeable battery; and
   an indicator controller for controlling the light-emitting indicator such that, when the charge state is detected by the charge detector, the light-emitting indicator lights up in a way different from a normal way used to indicate said first status.

2. The wireless communication apparatus according to claim 1, wherein the light-emitting indicator lights up in a first way when an incoming call occurs and in a second way when the charge state is detected by the charge detector.

3. A wireless communication apparatus comprising:
   a rechargeable battery as a power supply for the wireless communication apparatus;
   a first connector for detachably connecting a first charging source to the rechargeable battery;
   a first detector for detecting a charge state by monitoring a voltage of the rechargeable battery;
   a second connector for detachably connecting a second charging source;
   a second detector for detecting connection of the second charging source; and
   a charge controller connected to the second connector, for charging the rechargeable battery using charge power received from the second charging source when the connection of the second charging source is detected.

4. The wireless communication apparatus according to claim 3, further comprising:
   a light-emitting indicator; and
   an indicator controller for controlling the light-emitting indicator such that the light-emitting indicator lights up in a way different from a normal way when at least one of the charge state and the connection of the second charging source is detected.

5. The wireless communication apparatus according to claim 4, wherein the light-emitting indicator lights up in a first way when an incoming call occurs and in a second way when at least one of the charge state and the connection of the second charging source is detected.

6. The wireless communication apparatus according to claim 3, wherein the charge controller operates in constant-current mode until the voltage of the rechargeable battery reaches a predetermined voltage and thereafter operates in constant-voltage mode.

7. The wireless communication apparatus according to claim 3, wherein the rechargeable battery comprises a lithium-ion battery.

8. The wireless communication apparatus according to claim 3, wherein the first charging source comprises a battery charger dedicated to the rechargeable battery and the second charging source comprises an AC-to-DC converter.

9. A wireless communication apparatus comprising:
a rechargeable battery as a power supply for the wireless communication apparatus;
a first connector for detachably connecting a first charging source to the rechargeable battery;
a first detector for detecting a charge state by monitoring a voltage of the rechargeable battery;
a second connector for detachably connecting a second charging source;
a second detector for detecting connection of the second charging source; and
a charge controller connected to the second connector, for charging the rechargeable battery using charge power received from the second charging source when the connection of the second charging source is detected, wherein the charge controller does not charge the rechargeable battery when both the charge state and the connection of the second charging source are concurrently detected.

10. A method for indicating a charge state in a wireless communication apparatus having a light-emitting indicator for indicating a first status of said apparatus and a rechargeable battery as a power supply, comprising:
detecting a charge state by monitoring a voltage of the rechargeable battery; and
controlling the light-emitting indicator such that, when the charge state is detected by the charge detector, the light-emitting indicator lights up in a way different from a normal way used to indicate said first status.

11. The method according to claim 10, wherein the light-emitting indicator lights up in a first way when an incoming call occurs and in a second way when the charge state is detected by the charge detector.

12. A method for charging a rechargeable battery of a wireless communication apparatus, comprising the steps of:
detecting connection of a battery charger by monitoring a voltage of the rechargeable battery;
detecting connection of an AC-to-DC converter;
charging the rechargeable battery using charge power received from the AC-to-DC converter when the connection of the AC-to-DC converter is detected and the connection of the battery charger is not detected; and
charging the rechargeable battery using charge power received from the battery charger when the connection of the battery charger is detected.

13. The method according to claim 12, further comprising the step of controlling a light-emitting indicator of the wireless communication apparatus such that the light-emitting indicator lights up in a way different from a normal way when at least one of the battery charger and the connection of the AC-to-DC converter is detected.

14. The method according to claim 13, wherein the light-emitting indicator lights up in a first way when an incoming call occurs and in a second way when at least one of the battery charger and the connection of the AC-to-DC converter is detected.

15. The method according to claim 12, wherein the rechargeable battery is charged in constant-current mode until the voltage of the rechargeable battery reaches a predetermined voltage and thereafter is charged in constant-voltage mode.

16. A method of alerting a user of a status of a communications apparatus having an internal rechargeable battery and a light emitting diode, said method comprising:
turning on said light emitting diode in a first manner to indicate a first status of said apparatus; and
turning on said light emitting diode in a second manner to indicate a charging operation of said internal rechargeable battery.

17. The method of claim 16, wherein said first status comprises an incoming call.

18. The method of claim 16, wherein said charging operation can be done by at least two different means.

19. The method of claim 16, wherein said light emitting diode is turned on in a third manner to indicate said internal battery is fully charged.

20. The method of claim 18, wherein one of said means comprises providing external power to a battery charger internal to said apparatus and said internal battery charger is inhibited if said external power is concurrently connected with any other of said at least two different charging means.

21. The method of claim 18, wherein said charging operation automatically selects a predetermined one of said at least two different recharging means if more than one of said at least two different charging means is concurrently connected.

22. A method of alerting a user of a status of a communications apparatus having an internal rechargeable battery and a light emitting diode, said method comprising:
turning on said light emitting diode in a first manner to indicate a first status of said apparatus; and
turning on said light emitting diode in a second manner to indicate a charging operation of said internal rechargeable battery,
wherein said charging operation can be performed by at least two different means and said second manner of controlling said light emitting diode comprises a different manner for each of said at least two different means.

23. A system for charging a battery for a portable device comprising first and second connectors and first and second detector for respectively connecting a first and second charging source to the battery and means for controlling the charging, wherein the controller does not charge the battery at all when both charging sources are concurrently detected.

* * * * *